United States Patent [19]

Sanchez

[11] Patent Number: 5,093,181
[45] Date of Patent: Mar. 3, 1992

[54] LOW FRICTION SELF-ALIGNING WEATHERSTRIPPING

[75] Inventor: Miguel Sanchez, Damman, Saudi Arabia

[73] Assignee: Schlegel Corporation, Rochester, N.Y.

[21] Appl. No.: 451,465

[22] Filed: Dec. 15, 1989

[51] Int. Cl.$^5$ .................. B32B 3/30; D04H 11/00; E06B 7/16
[52] U.S. Cl. .................. 428/167; 49/482; 49/483; 49/489; 49/495; 428/92
[58] Field of Search .................. 428/97, 92, 364, 372, 428/167; 49/489, 482, 483, 495

[56] References Cited

U.S. PATENT DOCUMENTS

| | | | |
|---|---|---|---|
| 3,175,256 | 3/1965 | Horton | 428/85 |
| 3,690,038 | 9/1972 | Dieterich | 49/489 |
| 3,881,980 | 5/1975 | Olson | 428/90 |
| 4,288,482 | 9/1981 | Beck | 428/97 X |
| 4,288,483 | 9/1981 | Miska et al. | 428/97 X |
| 4,458,450 | 7/1984 | Young et al. | 49/489 |
| 4,761,320 | 8/1988 | Coburn, Jr. | 428/167 |

Primary Examiner—George F. Lesmes
Assistant Examiner—Terrel Morris
Attorney, Agent, or Firm—Cumpston & Shaw

[57] ABSTRACT

An improved weatherstrip includes a longitudinally extending backing strip, having a front surface and a rear surface; a sealing body attached to the front surface of the backing strip; and a plurality of longitudinally extending grooves formed in the rear surface of the backing strip for reducing the frictional forces between the backing strip and a mounting slide, increasing the surface area for speeding the cooling of the backing strip during manufacture, and for aligning the strip during slitting.

13 Claims, 2 Drawing Sheets

5,093,181

LOW FRICTION SELF-ALIGNING WEATHERSTRIPPING

BACKGROUND OF THE INVENTION

This invention relates in general to weatherstrips, and more particularly to an improved weatherstrip of the type having a sealing body attached to an elongated backing strip, for installation, for example, in a slot, the improved weatherstrip having friction reducing self-aligning grooves formed in the backing strip.

Weatherstrips in which a sealing body is attached to a longitudinally extending backing strip have been widely used for many years. Among the popular and effective weatherstrips of this type is the weatherstrip described in U.S. Pat. No. 3,175,256 of R. C. Horton issued Mar. 30, 1965, the disclosure of which is incorporated herein by reference.

In the manufacture of weatherstrip and similar weatherstrips, a backing or substrate which may be formed from polypropylene yarns, for example, is woven in a loom in a width sufficient to form a multiplicity of parallel elongate weatherstrip elements. During the weaving operation, a plurality of spaced apart parallel pile strips is inserted into the backing and is arranged to project upwardly therefrom to form parallel rows of sealing bodies. Typically, the pile rows are formed from yarns such as single or multiple filament polypropylene yarns that have preferably been treated with silicone, and stabilized against degradation by ultraviolet radiation, so as to have a long life in out of door applications. Following the weaving and pile insertion operations, a suitable plastic material, such as polypropylene is extruded onto the substrate, particularly onto the face of the substrate opposite that from which the pile rows project. This step secures the pile in place, since the pile yarns extend through the substrate, and portions thereof appear on the back surface of the substrate; increases the rigidity of the substrate; and permits the substrate to be slit between the pile strips without fraying.

After the extrusion step, the substrate is slit between the pile strips to form individual lengths of weatherstrip, each consisting of a plastic coated backing strip or substrate with a sealing body upstanding therefrom. Preferably, a barrier strip of moisture impervious, flexible sheet material, such as polypropylene for example, is positioned within the pile strip running the length thereof, and is secured to the substrate or sealing body for example, by heat sealing. More recently, in U.S. Pat. No. 4,288,483, the disclosure of which is incorporated herein by reference, Miska et al have described a weatherstrip of the type just described, in which the flexible backing or substrate of the weatherstrip is fabricated of woven strands of either a thermoplastic material and a thermal setting material; two thermoplastic materials that have different melting points; or a thermoplastic material and some other material having a higher melting point. The pile strips which are composed of resisient fibers, can be woven into the substrate in the same way just described. However, instead of then having to extrude a suitable plastic material onto the back of the substrate, heat is simply applied to the back of the substrate to an extent sufficient to cause the thermoplastic material to melt. This seals the substrate by bonding the strands together, secures the pile strips in place, and prevents fraying of the substrate when it is subsequently slit. Heat sealing can be easily accomplished by passing the substrate over a heated rod, such as a brass rod, at a temperature between 440° and 460° F., for example, at a speed of 3.1 ft. per minute.

It will be appreciated that the foregoing and other details of the method for manufacturing weatherstrips of the type herein described are exemplary only, and per se form no particular part of this invention except in combination with the novel aspects hereof.

Weatherstrips of the type described, although providing salutory performance in a variety of applications for many years, nevertheless suffer from several disadvantages. Often, when long lengths of weatherstrip are installed in a T-slot or similar mounting structure, the sliding friction between the backing strip and the surface of the T-slot make installation difficult. While lubricants can be employed to reduce the friction, they are often messy, and complicate the installation process.

A second problem arises during manufacture of the weatherstrips. As described above, the weatherstrips are preferably made in batches on a wide substrate, and subsequently slit into individual strips. It is a requirement of efficient manufacture that the slitting operation be carried out at high speeds, while maintaining accurate longitudinal alignment with the sealing bodies, so that a weatherstrip is produced in which the sealing body is centered and straight with respect to the backing strip. It is an advantage if the slitting operation can be carried out at high speed, since this reduces the cost of the product.

Maintaining accurate alignment has heretofore been a problem and in many instances, trimming operations have been required following separation of the web into individual weatherstrips, to achieve the necessary tolerances.

Still further, the speed of manufacture of weatherstrips of the type described herein is also related to the time that it takes for the extruded or melted portion of the backing strip to cool and become dimensionally stable. The strip cannot be cut until the substrate has cooled, and this is often a limiting factor in the speed of manufacture.

Because the weatherstrips to which this invention relates are manufactured and used in large quantities, cost is always a consideration. The cost of materials is a significant portion of the total cost of the weatherstrip, and reducing the amount of material required to manufacture the weatherstrip is an important consideration in keeping the cost low.

Accordingly, it is an object of this invention to provide a weatherstrip that addresses these and other problems of prior art for weatherstrips, and provides an improved weatherstrip in which frictional forces between the weatherstrips and the mounting slot that impede installation are reduced; in which the strip is substantially self-aligning during cutting, so that higher speeds and yields may be achieved; in which the cooling time for the thermoplastic backing material is reduced; and in which the amount of polypropylene backing material required to form the weatherstrip is reduced.

Briefly stated, in accordance with the presently preferred embodiment of this invention, an improved weatherstrip includes a longitudinally extending backing strip, having a front surface and a rear surface; a sealing body attached to the front surface of the backing strip; and a plurality of longitudinally extending grooves formed in the rear surface of the backing strip for reducing the frictional forces between the backing strip and a mounting slot, increasing the surface area for speeding the cooling of the backing strip during manufacture, and for aligning the strip during slitting.

In accordance with another aspect of this invention, the grooves described above are provided having a depth less than half the overall thickness of the backing strip.

In accordance with yet another aspect of this invention, the grooves have a generally V-shaped section, in which the peak-to-peak spacing is greater than the depth of the grooves.

In accordance with still another aspect of this invention, the backing strip comprises a layer of fabric and a layer of thermoplastic material on the layer of fabric.

In accordance with a still further embodiment of this invention, the layer of thermoplastic material is a polypropylene resin layer.

A method for manufacturing a weatherstrip in accordance with this invention includes the steps of weaving strands of an appropriate material to form a substrate, knitting or weaving or otherwise inserting filaments of pile material through the substrate or attaching an alternate sealing body at spaced locations along the substrate; extruding a coating of polypropylene resin onto the surface of the substrate opposite the sealing body; cooling the extruded backing material to the point where the material sets without further flow; and embossing or cutting a plurality of parallel grooves onto said backing strip in a direction parallel to the longitudinal extent of the weatherstrips.

The novel aspects of the invention are set forth with particularity in the appended claims. The invention itself, together with further objects and advantages thereof, may be more readily appreciated by reference to the following detailed description of the invention taken in conjunction with the accompanying drawings, in which:

Figure 1:
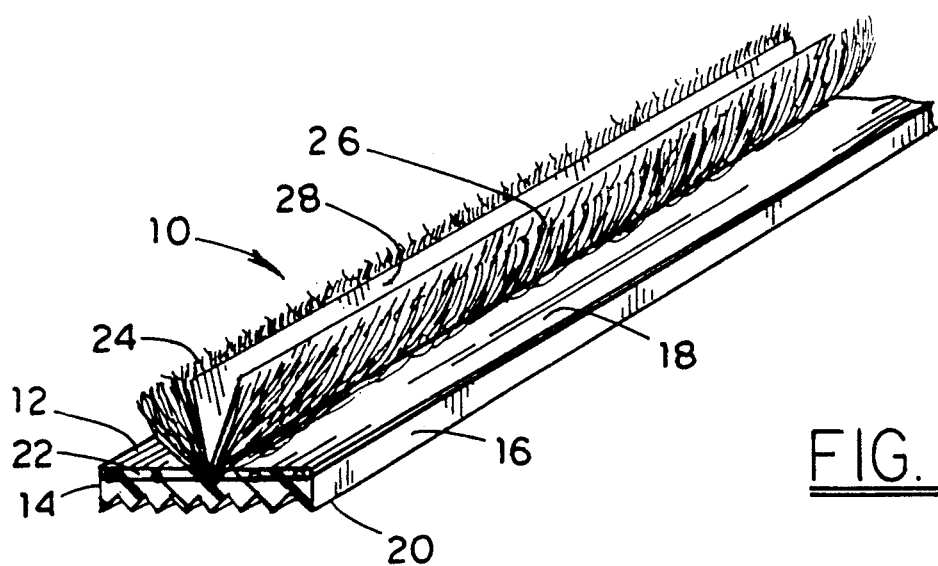
FIG. 1 is a perspective view of a weatherstrip in accordance with the invention.

Referring now to FIG. 1, a section of a weatherstrip element in accordance with this invention is shown in perspective. While the invention is illustrated in conjunction with a pile weatherstrip, that is a weatherstrip in which the sealing body comprises a row of upstanding pile filaments, those skilled in the art will recognize that weatherstrips incorporating sealing bodies of other constructions such as foam bulbs, leafs, flaps and the like, may also be employed. As used herein, the term "sealing body" is intended to comprehend all such constructions. The weatherstrip 10 includes a longitudinally extending backing strip 12, having edge surfaces 14 and 16 defining an elongated substantially flat front surface 18 and a rear surface 20. Front and rear are used herein for convenience in distinguishing the surfaces, it being understood that in use, the weatherstrip may be mounted in a multiplicity of orientations. Front denotes the side of the weatherstrip to which the sealing body is attached. Rear is the other side.

The backing strip 12 is preferably formed from a layer of fabric material 22, that may be woven or knitted or the like to form an elongated sheet of material. Fibers of pile are inserted between the threads of the fabric layer in a straight line intermediate the edges to form two upstanding rows of pile 24 and 26 extending the length of the weatherstrip. Together, the pile rows constitute the sealing body. Preferably, a V-shaped impervious barrier strip 28 is attached to the weatherstrip between the two rows of pile fibers. In accordance with another known method of manufacturing weatherstrip, the base is extruded directly, that is not over a woven backing strip, and a sealing body, such as a pile sealing body, is attached directly to the extruded base for example, by ultrasonic welding or the like. All of the foregoing is more or less conventional, and may be practiced in accordance with any of the techniques for forming such weatherstrips known to those skilled in the art.

Figure 2:
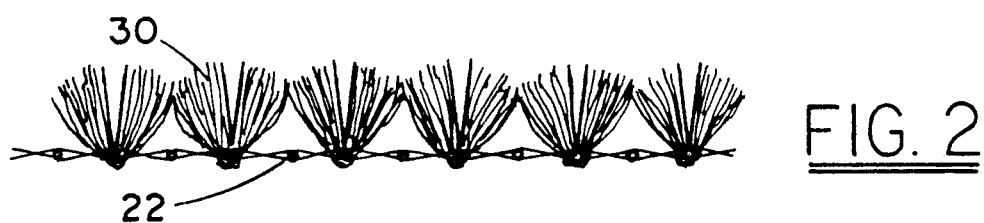
FIGS. 2, 3 and 4 are section views of a weatherstrip in accordance with this invention in the process of manufacture.
Figure 3:
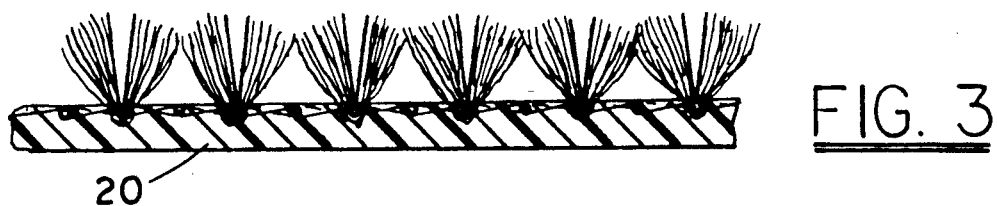
Figure 4:
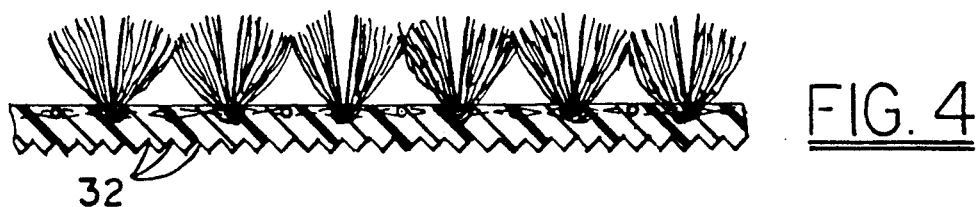
Figure 5:
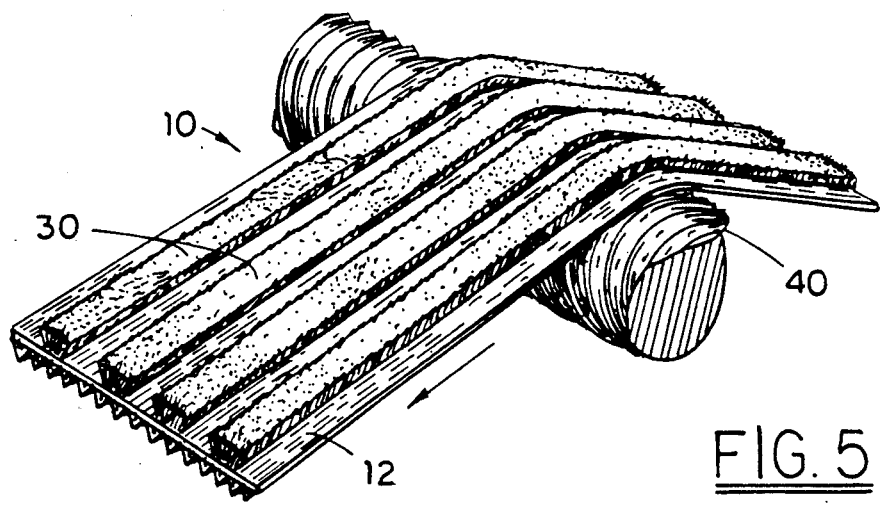
FIG. 5 is a perspective view of a web including a plurality of weatherstrips in accordance with this invention, in the process of manufacture.

The construction of a weatherstrip as described above, as well as the manufacture of a weatherstrip in accordance with this invention, may be more readily understood by referring now also to FIGS. 2-4. FIGS. 2-4 show a plurality of weatherstrips in the process of manufacture. The knitted or woven substrate or backing strip 22 is formed by conventional means in a width suitable for forming a plurality of individual weatherstrip elements. A plurality of pile fibers is punched or otherwise inserted through the web, preferably in U-shaped form, with the loose ends of filaments of pile material extending outwardly from the front surface of the substrate. Alternatively, the woven backing strip and pile sealing bodies may be woven simultaneously. As shown in FIG. 3, after the substrate and rows of pile material have been assembled, the web is passed through an extruder which applies a layer of thermoplastic material to the backing strip, substantially enveloping the fabric thereof in a long flat generally rectangular body 20. The weatherstrip web, as it leaves the extruder, has a generally flat rear surface. Preferably, the extruded web is allowed to cool slightly, to the point where the material is dimensionally stable and no longer flows readily. Thereafter, a plurality of grooves 32 is formed in the rear surface of the weatherstrip, for example by passing the slightly cooled web over a grooved fixed or rotating roller, as shown in FIG. 5, by cutting, embossing, or by any other means suitable for forming grooves of the type described herein.

While the dimensions of the backing strip and grooves of a weatherstrip in accordance with this invention may vary widely to accommodate particular applications, applicant has found that a particularly effective 6.9 mm wide weatherstrip has a backing layer 0.45 mm thick, a thermoplastic layer 0.35 mm thick, grooves 0.25 mm deep with a peak-to-peak spacing of 0.5 mm. The web of weatherstrip elements leaving the grooved roller then cools by convection, or other known means, to form a stable element. Because the surface area of the rear surface of the weatherstrip web is increased by the presence of the grooves, the cooling process proceeds more rapidly than has heretofore been possible, thus allowing the manufacture of the weatherstrips to be speeded up.

Figure 6:
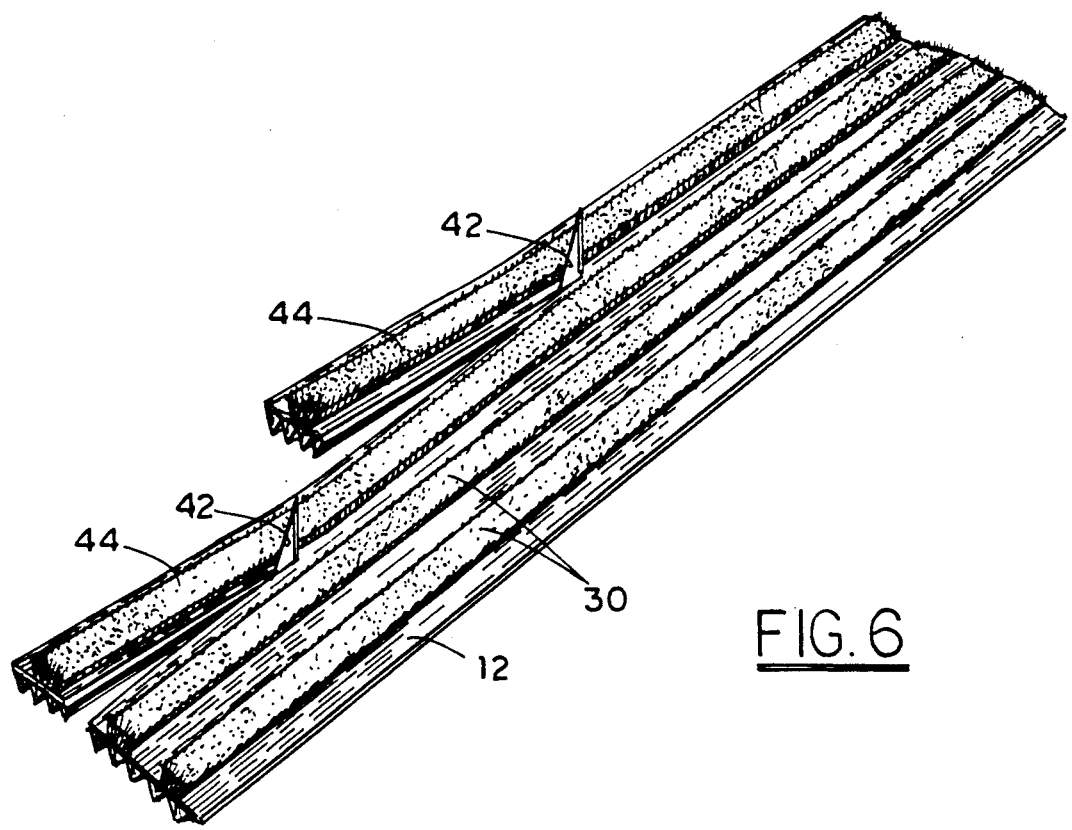
FIG. 6 shows a web of weatherstrips being slit into individual weatherstrip elements.

After the web of weatherstrips has cooled to the point where further operations can be undertaken, the web is slit, as shown in FIG. 6 into individual weatherstrip elements 44. During slitting, it is necessary to maintain the web in precise alignment with the slitting knives 42. The longitudinally extending grooves substantially assist in maintaining the necessary alignment.

Applicant has found that the slitting knives tend to actually follow the grooves, possibly because the backing strip is thinnest at the bottom of the grooves. Accordingly very accurate high speed slitting operations may be performed.

The slit weatherstrip may be cut to desired lengths and packaged in boxes, rolled upon reels for shipping in bulk, or otherwise packaged for use.

In use, the weatherstrip of this invention has substantially lower friction during insertion into mounting slots or the like, than weatherstrips heretofore known. In many cases, it is entirely unnecessary to lubricate the strip during installation, thereby eliminating a possibly messy, time consuming and expensive step.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A weatherstrip comprising:
   a longitudinally extending backing strip having a front surface and a rear surface;
   a sealing body attached to the front surface; and
   a plurality of longitudinally extending grooves formed in the rear surface of the backing strip extending along the length thereof substantially parallel to the first and second edges of the strip.

2. The weatherstrip of claim 1 wherein said grooves comprise a plurality of generally V-shaped grooves formed in the rear surface.

3. The weatherstrip of claim 1 in which the grooves have a depth less than half the overall thickness of the backing strip.

4. The weatherstrip of claim 1 in which the grooves have a peak-to-peak spacing greater than their depth.

5. The weatherstrip of claim 1 in which the backing strip comprises a layer of fabric and a layer of thermoplastic material on the layer of fabric.

6. The weatherstrip of claim 5 in which the layer of thermoplastic material comprises a layer of polypropylene resin.

7. A weatherstrip comprising:
   a longitudinally extending backing strip having first and second edges, a front surface and a rear surface;
   a sealing body attached to the front surface;
   a plurality of longitudinally extending grooves formed in the rear surface of the backing strip extending along the length thereof substantially parallel to the first and second edges of the strip.

8. The weatherstrip of claim 7 wherein said grooves comprise a plurality of generally V-shaped grooves formed in the rear surface.

9. The weatherstrip of claim 7 in which the grooves have a depth less than half the overall thickness of the backing strip.

10. The weatherstrip of claim 8 in which the grooves have a peak-to-peak spacing greater than their depth.

11. The weatherstrip of claim 7 in which the backing strip comprises a layer of fabric and a layer of thermoplastic material on the layer of fabric.

12. The weatherstrip of claim 7 in which the layer of thermoplastic material comprises a layer of polypropylene resin.

13. A method for making a self-aligning, low friction weatherstrip comprising:
   forming an elongated web of weatherstrip material comprising a backing layer;
   attaching parallel rows of sealing bodies to said backing layer, said sealing bodies aligned along the longitudinal extent of the backing layer;
   forming a thermoplastic body on said backing layer;
   allowing said thermoplastic body to cool; and
   forming a plurality of longitudinally extending grooves in said body on a surface thereof opposite said sealing body.

* * * * *